Aug. 1, 1967 J. S. TAYLOR 3,334,234
COAXIAL CABLE UNIT MEASURING DEVICE AND MISSING DISC INDICATOR
Filed May 8, 1963 2 Sheets-Sheet 1

INVENTOR.
J.S. TAYLOR
BY
S. Gundersen
ATTORNEY

3,334,234
COAXIAL CABLE UNIT MEASURING DEVICE AND MISSING DISC INDICATOR
James S. Taylor, Baltimore, Md., assigor to Western Electric Company, Incorporated, New York, N.Y., a corporation of New York
Filed May 8, 1963, Ser. No. 278,933
5 Claims. (Cl. 250—209)

This invention relates to a device for indicating the absence of one of a series of articles on a carrier strip and particularly to a photoelectric sensing device for shutting down a coaxial cable line in response to an indication that a spacer disc is missing.

In the manufacture of coaxial cable, it is common to place plastic discs at spaced intervals on a solid inner conductor and then to cover the discs with a conductive tape so as to form the outer conductor. The discs serve as spacers for the outer and inner conductors. In order to maintain the outer conductor coaxial with respect to the inner conductor so that the electrical properties of the coaxial cable are uniform, it is necessary to properly space the discs. Where spacer discs are missing, the proper spacing of the inner and outer conductors and the dielectric constant will be disrupted so as to detrimentally effect the electrical properties of the cable produced.

In the prior art difficulty is encountered in detecting a missing disc, as frequently components of the disc detecting device will fail. Thus, nonconforming cable will be manufactured so long as the component failures of the detecting device are not discovered.

It is, therefore, an object of the present invention to provide facilities for indicating the absence of one of a series of articles on a carrier strip.

A further object of the invention is to provide facilities for photoelectrically detecting the absence of one of a series of articles on a carrier strip and to give an alarm in response to such indication.

Another object of the invention is to provide facilities for indicating when component parts of a detection circuit fail.

With these and other objects in view, the present invention contemplates the use of a signal-handling circuit for sequentially receiving pulses from a first and a second detector wherein the first detector senses movement of an article applicator and the second detector senses the presence of an article, the pulses from the first and second detector switching the signal-handling circuit so that upon a break in the alternating sequence of the pulses, facilities will be actuated to indicate the same.

Other objects and advantages of the present invention will be apparent from the following detailed description when considered in conjunction with the drawings wherein.

Figure 1:
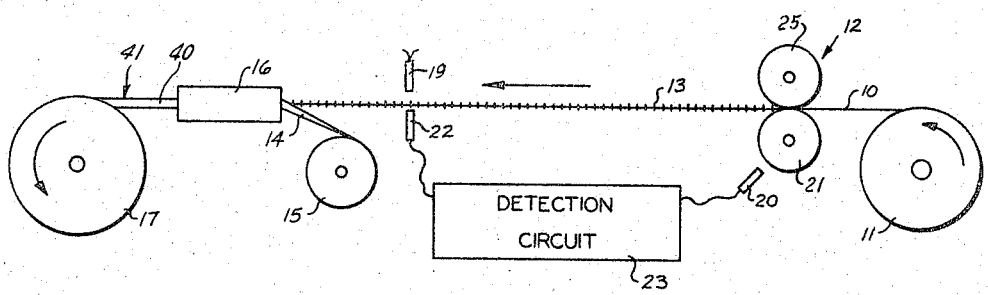
FIG. 1 is a schematic of an apparatus embodying the principal features of the invention.

Referring to the drawings and particularly to FIG. 1, an apparatus is shown for manufacturing coaxial cable. An inner conductor 10 is pulled from a supply reel 11 and a disc applicator 12 places discs 13—13 at spaced intervals on the inner conductor 10. A tape 14 is pulled from a supply reel 15 and is formed about the inner conductor 10 and spaced discs 13—13 by a forming tool 16 so as to form an outer coaxial conductor 40 of a coaxial cable unit, designated generally by the numeral 41. A take-up reel 17 pulls the coaxial cable unit 41 through the system. An applicator wheel photo pick-up or detector 20 produces a signal each time an applicator wheel 21 is indexed to place one of the discs 13—13 on the inner conductor 10. A disc photo pick-up or detector 22 produces a signal each time one of the discs 13—13 passes between the detector 22 and a light source 19. A detection circuit 23 is then utilized to indicate when a disc 13 is missing.

Figure 2:
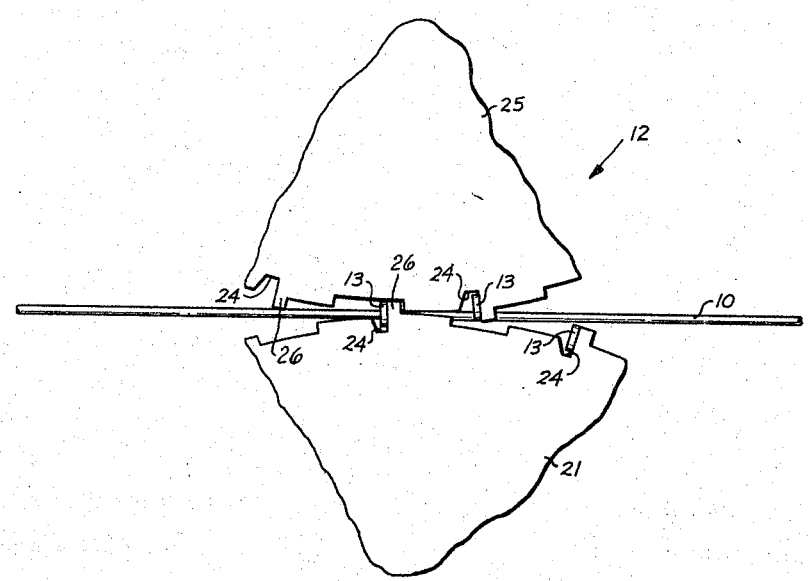
FIG. 2 is an enlarged view of a disc applicator.

In FIG. 2 the details of the disc applicator 12 are set forth. The discs 13—13 are carried in slots 24—24 of the applicator wheels 21 and 25. As the applicator wheels 21 and 25 are indexed, the discs 13—13 will be placed on the inner conductor 10. Further particulars of the applicator 12 are disclosed in Patent 2,426,623.

Figure 3:
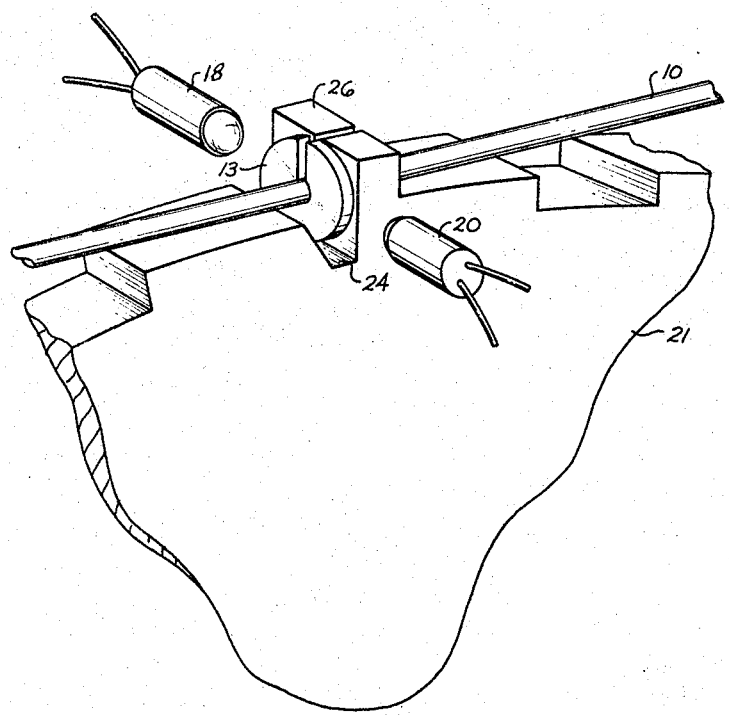
FIG. 3 is an enlarged view of a disc applicator wheel.

As seen in FIGS. 2 and 3, the applicator wheels 21 and 25 are provided with protrusions or fingers 26—26. As the applicator wheel 21 is indexed, the fingers 26—26 of the wheel 21 interrupt the light emitted from a light source 18. The photoelectric detector 20 senses the interruptions of the light from the light source 18 by the fingers 26—26 of the wheel 21 and produces a pulse in response to each such interruption. As within the interval in which two adjacent fingers 26—26 of wheel 21 interrupt the light source 18, the wheel 25 also indexes so as to place one of the discs 13—13 on the inner conductor 10, each pulse produced by the detector 20 will indicate that two spacer discs should have been placed on the inner conductor 10 by the disc applicator 12.

Obviously, it is not necessary to provide two applicator wheels. By rotating a single applicator wheel at twice the speed or slowing the speed of the inner conductor down by one half, the same results would be obtained.

Figure 4:
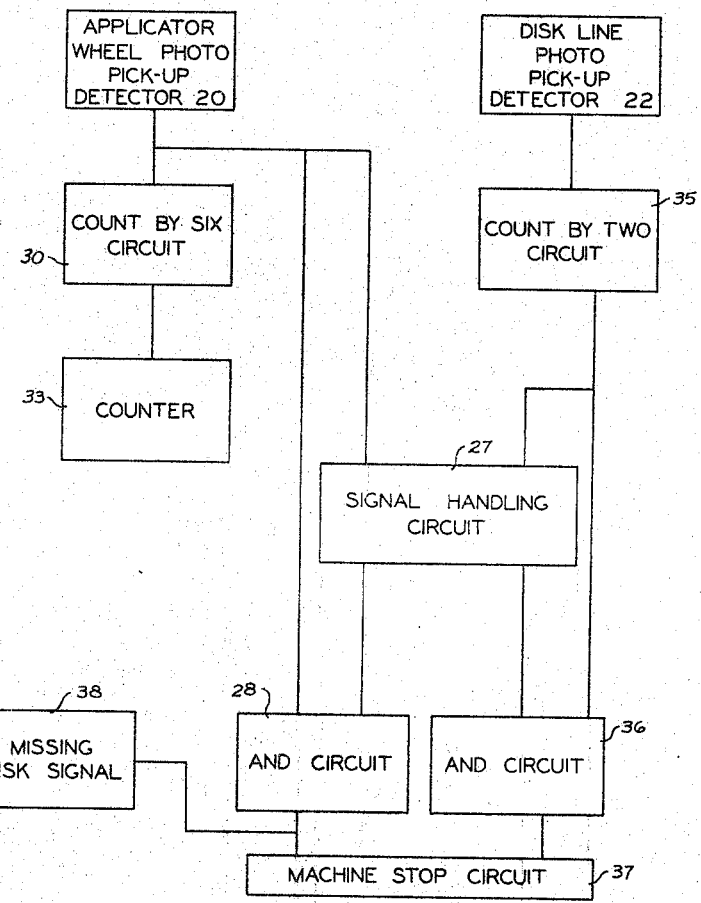
FIG. 4 is a schematic circuit diagram showing the operation of a detection circuit embodying the principles of the invention.

In FIG. 4 it will be noted that the signal from the applicator wheel photo pick-up, detector 20, will be routed to a signal-handling circuit 27 such as a flip-flop circuit or a bistable multivibrator circuit, an "and" circuit 28, and a "count-by-six" circuit 30.

The "count-by-six" circuit 30 is utilized as in this particular type of coaxial cable the spacer discs 13—13 are spaced at approximately one-inch intervals. Any conventional "count-by" circuit can be utilized so as to produce an output pulse for each six input pulses received from the detector 20. As a pulse from the detector 20 indicates that two spacer discs 13—13 have been placed on the inner conductor 10, each such pulse will indicate that two inches of coaxial cable have been produced. As the "count-by" circuit 30 pulses a counter 33 once, for each six pulses received from the detector 20, the counter 33 will advance by one-foot intervals so as to indicate the amount of cable produced. Obviously, if a different spacing of the discs 13—13 is utilized, it will be necessary to use a different "count-by" circuit in order to get a correct footage read out.

Error can be introduced in the footage read out on the counter 33 due to slippage between the inner conductor 10 and the applicator 12. Further error can result due to slight variations in the application of the spacer discs 13—13 to the inner conductor 10 by the applicator 12. In order to compensate for such errors, a feedback circuit (not shown) may be provided for the "count-by-six" circuit 30.

The detector 22, as stated above, produces a signal for each disc 13 which passes between the photo pick-up of the detector and the light source 19. A "count-by-two" circuit 35 produces a single pulse for two pulses received from the photo pickup 22. The pulse from the "count-by-two" circuit 35 is routed to the single-handling circuit 27 and to an "and" circuit 36.

There is, of course, no necessity to use a "count-by-two" circuit if only a single applicator wheel is used.

In setting up the machine, the detectors 20 and 22 are spaced so that they are actuated sequentially. The discs 13—13 are then placed on the inner conductor 10 between the photo pick-up 22 and the disc applicator 12. When the machine is started, the applicator wheel 21 is indexed and the photo pick-up 20 will route a pulse to the signal-handling circuit 27 so as to change the state of the circuit 27.

The "and" circuit 28 will not be fully conditioned by the pulse from photo pick-up 20 since the state of the signal-handling circuit is such that there will be absent the required coincidence of pulses at the "and" circuit 28 essential to fully condition the "and" circuit 28.

If there are no missing discs, then before another pulse will be produced by the photo pick-up 20, a pulse will be produced by the "count-by-two" circuit 35. The pulse from "count-by-two" circuit 35 will then change the state of the signal-handling circuit 27. The pulse received by the "and" circuit 36 from the "count-by-two" circuit 35 will not fully condition a machine stop circuit 37 as the state of the signal-handling circuit 27 will have been changed by the prior pulse from the detector 20 so that there will not be the required coincidence of pulses at the "and" circuit 36. Therefore, so long as there are no missing discs 13—13, the signals from the photo pick-ups 20 and 22 will only change the state of the signal-handling circuit 27.

If one or more discs 13—13 are missing, the photo pick-up 20 will pulse before the "count-by-two" circuit 35. Therefore, the signal-handling circuit 27 will change state and the "and" circuit 28 will, then, coincidentally receive the two voltage pulses which will fully condition the "and" circuit 28. The machine stop circuit 37 is actuated by the resulting pulse from the "and" circuit 28 to shut down the cable line, and the missing disc signal 38 is also actuated.

If no signal is received from the photo pick-up 20 due to the failure of the same, the state of the signal-handling circuit 27 will be such as to provide pulse coincidence at the "and" circuit 36 which will fully condition the "and" circuit 36. The resulting output pulse from the fully conditioned "and" circuit 36 actuates the machine stop circuit 37 so as to shut down the line. The same results are obtained upon failure of the photo pick-up 22.

It is to be understood that the above-described arrangements of apparatus and construction of elemental parts are simply illustrative of an application of the principles of the invention and many other modifications may be made without departing from the invention.

What is claimed is:

1. In a device for manufacturing coaxial cable having an applicator for applying spacer discs to an inner conductor, a circuit for sensing the absence of one of a series of spacer discs on the inner conductor of the coaxial cable, said circuit comprising:
   a first photoelectric detector for producing a pulse in response to continuous movement of the applicator,
   a second photoelectric detector for producing a pulse when a disc is on the inner conductor,
   a bistable multivibrator,
   means for sequentially transmitting the pulses from the first and second detector to the bistable multivibrator, said pulses changing the state of the multivibrator so that upon receiving two successive pulses from the same detector the multivibrator will produce a pulse, and
   means responsive to the pulse produced by the multivibrator for indicating a break in the alternating sequence of transmitted pulses from the first and second detector so as to indicate the absence of a spacer disc on the inner conductor.

2. A device for applying spacer discs to the inner conductor of a coaxial cable and for sensing the absence of one of a series of spacer discs on the inner conductor, comprising:
   an applicator wheel having spaced radial fingers, said applicator wheel applying spacer discs to the inner conductor upon rotation of the applicator wheel.
   a first light source mounted to one side of the applicator wheel so that upon continuous rotation of said applicator wheel the radial fingers of the wheel will repeatedly interrupt the light emitted by the light source,
   a first detector for photoelectrically sensing the interruptions of the light source by the fingers on the applicator wheel and for producing a pulse each time the light is interrupted,
   a second light source mounted to one side of the coaxial cable so that upon a spacer disc carried by the inner conductor passing by the second light source the light emitted by the second light source will be interrupted,
   a second detector for photoelectrically sensing the interruption of the light source by the spacer discs and for producing a pulse each time the light source is interrupted,
   a bistable circuit for sequentially receiving the pulses from the first and second detector, the pulses from the first and second detector changing the state of said bistable circuit so that upon two successive pulses from a single detector said bistable circuit will produce a pulse, and
   means responsive to the pulse produced by said bistable circuit for stopping the coaxial cable for repair.

3. A device for applying spacer discs to the inner conductor of a coaxial cable and for sensing the absence of one of a series of spacer discs on the inner conductor, comprising:
   an applicator wheel having spaced radial fingers, said applicator wheel applying spacer dics to the inner conductor upon rotation of the applicator wheel,
   a first light source mounted to one side of the applicator wheel so that upon continuous rotation of said applicator wheel the radial fingers of the wheel will repeatedly interrupt the light emitted by the light source,
   a first detector for photoelectrically sensing the interruptions of the light source by the fingers on the applicator wheel and for producing a pulse each time the light is interrupted, each of said pulses indicating that said applicator wheel has rotated sufficiently to place two spacer discs on the inner conductor,
   a second light source mounted to one side of the coaxial cable so that upon a spacer disc carried by the inner conductor passing by the second light source the light emitted by the second light source will be interrupted,
   a second detector for photoelectrically sensing the interruptions of the light source by the space disc and for producing a pulse each time a spacer disc interrupts the light source,
   a "count-by-two" circuit for receiving the pulses from the second detector and for producing a single pulse for every two pulses received from the second detector,
   a bistable circuit for sequentially receiving the pulses from the first detector and from the "count-by-two" circuit, the pulses, changing the state of said bistable circuit so that upon a second pulse from the first detector prior to a pulse from the "count-by-two" circuit said bistable circuit will produce a pulse, and
   means for receiving the pulse produce by said bistable circuit so as to stop the coaxial cable for repair.

4. In a device for manufacturing coaxial cable having an applicator for applying spacer discs to an inner conductor, a circuit for sensing the absence of one of a series of spacer discs on the inner conductor of the coaxial cable, said circuit comprising:
- a first detection means for sensing the movement of successive portions of the applicator adjacent to the detection means and for producing successive pulses in response to the movement of the successive portions of the applicator adjacent to the first detection means,
- a second detection means for sensng the movement of successive spacer discs adjacent to the second detection means and for producing successive pulses in response to the movement of the successive spacer discs adjacent to the second detection means,
- a signal handling circuit for sequentially receiving the successively produced pulses from the first and second detection means, the sequential pulses from the first and second detection means alternately conditioning said signal handling circuit so that pulses are developed sequentially alternately by the signal handling circuit in response to the input of successive pulses alternately from the first and second detection means and appear sequentially alternately on outputs of the signal handling circuit,
- a first "and" circuit for receiving the successive pulses produced by the first detection means and for receiving the successive output pulses from the signal handling circuit which are developed by the signal handling circuit in response to successive input pulses from the second detection means, the coincidence of one of the successive pulses from the first detection means and one of the successive pulses from the signal handling means appearing on the inputs of the first "and" circuit occurring when one of the spacer discs is missing as the successive disc are moved adjacent to the second detection means and developing an output pulse from the first "and" circuit,
- a second "and" circuit for receiving the successive pulses from the second detection means and for receiving the successive pulses developed by the signal handling circuit in response to the successive input pulses from the first detection means, the coincidence of one of the successive pulses from the second detection means and one of the successive pulses from the signal handling circuit appearing on the inputs of the second "and" circuit occurring in the absence of one pulse of the successive pulses produced by the first detection means and developing an output pulse from the second "and" circuit, and
- means responsive individually to the separately developed pulses from the first and second "and" circuits for stopping the manufacture of the coaxial cable.

5. In a device for manufacturing coaxial cable having an applicator for applying spacer discs to an inner conductor, a circuit for sensing the absence of one of a series of spacer discs on the inner conductor of the coaxial cable and for measuring the length of the cable, said circuit comprising:
- a first detection means for sensing the movement of successive portions of the applicator adjacent to the detection means and for producing successive pulses in response to the movement of the successive portions of the applicator adjacent to the first detection means,
- a second detection means for sensing the movement of successive spacer discs adjacent to the second detection means and for producing successive pulses in response to the movement of the successive spacer discs adjacent to the second detection means,
- a signal handling circuit for sequentially receiving the successively produced pulses from the first and second detection means, the sequential pulses from the first and second detection means alternately conditioning said signal handling circuit so that pulses are developed sequentially alternately by the signal handling circuit in response to the input of successive pulses alternately from the first and second detection means and appear sequentially alternately on outputs of the signal handling circuits,
- a first "and" circuit for receiving the successive pulses produced by the first detection means and for receiving the successive output pulses from the signal handling circuit which are developed by the signal handling circuit in response to successive input pulses from the second detection means, the coincidence of one of the successive pulses from the first detection means and one of the successive pulses from the signal handling means appearing on the inputs of the first "and" circuit occurring when one of the spacer discs is missing as the successive discs are moved adjacent to the second detection means and developing an output pulse from the first "and" circuit,
- a second "and" circuit for receiving the successive pulses from the second detection means and for receiving the successive pulses developed by the signal handling circuit in response to the successive input pulses from the first detection means, the coincidence of one of the successive pulses from the second detection means and one of the successive pulses from the signal handling circuit appearing on the inputs of the second "and" circuit occurring in the absence of one pulse of the successive pulse produced by the first detection means and developing an output pulse from the second "and" circuit,
- means responsive individually to the separately developed pulses from the first and second "and" circuits for stopping the manufacture of the coaxial cable, and
- means responsive to the successive pulses produced by the first detection means for indicating the length of the coaxial cable manufactured.

References Cited
UNITED STATES PATENTS

| | | | |
|---|---|---|---|
| 1,992,687 | 2/1935 | Anderson | 250—223 X |
| 2,171,362 | 8/1939 | Gulliksen | 250—223 |
| 2,793,345 | 5/1957 | Hags | 250—83.4 |
| 2,994,783 | 8/1961 | Looschen | 250—219 |
| 3,114,902 | 12/1963 | Tanguy | 250—223 X |
| 3,188,619 | 6/1965 | Hemphill et al. | 340—259 |
| 3,219,992 | 11/1965 | Stuckbery et al. | 340—259 |
| 3,264,630 | 8/1966 | Conklin | 340—259 |

RALPH G. NILSON, *Primary Examiner.*

E. STRICKLAND, M. A. LEAVITT,
*Assistant Examiners.*